(12) United States Patent
Achunche

(10) Patent No.: US 10,139,029 B2
(45) Date of Patent: Nov. 27, 2018

(54) ARRANGEMENT FOR ADJOINING A SUPPORT STRUCTURE TO A PIPE

(71) Applicant: ROLLS-ROYCE POWER ENGINEERING PLC, Derby (GB)

(72) Inventor: Iansteel Achunche, Derby (GB)

(73) Assignee: ROLLS-ROYCE POWER ENGINEERING PLC, Derby (GB)

( * ) Notice: Subject to any disclaimer, the term of this patent is extended or adjusted under 35 U.S.C. 154(b) by 137 days.

(21) Appl. No.: 15/402,794

(22) Filed: Jan. 10, 2017

(65) Prior Publication Data
US 2017/0219154 A1   Aug. 3, 2017

(30) Foreign Application Priority Data

Feb. 2, 2016  (GB) .................. 1601820.2

(51) Int. Cl.
| | | |
|---|---|---|
| *F16L 3/00* | (2006.01) | |
| *F16L 55/035* | (2006.01) | |
| *F16L 59/12* | (2006.01) | |
| *F16L 59/21* | (2006.01) | |
| *F16L 5/02* | (2006.01) | |
| *F16L 51/02* | (2006.01) | |
| *F16L 3/16* | (2006.01) | |

(52) U.S. Cl.
CPC ............... *F16L 55/035* (2013.01); *F16L 3/16* (2013.01); *F16L 5/022* (2013.01); *F16L 5/025* (2013.01); *F16L 51/025* (2013.01); *F16L 59/121* (2013.01); *F16L 59/21* (2013.01)

(58) Field of Classification Search
CPC ......... F16L 5/025; F16L 59/21; F16L 19/121; F16L 51/025; F16L 55/035; F16L 3/16; F16L 59/18

USPC ....... 138/106–108, 121; 248/56; 267/140.11, 267/140.12; 277/634–636; 52/220.8; 285/224, 226

See application file for complete search history.

(56) References Cited

U.S. PATENT DOCUMENTS

| | | | | |
|---|---|---|---|---|
| 2,620,208 A | * | 12/1952 | Patch ................ | B64C 13/30 |
| | | | | 180/90.6 |
| 2,779,609 A | * | 1/1957 | Portney ............... | F16L 5/025 |
| | | | | 285/123.17 |
| 3,830,083 A | * | 8/1974 | Hadick ................ | F16D 3/845 |
| | | | | 277/636 |

(Continued)

FOREIGN PATENT DOCUMENTS

| | | |
|---|---|---|
| DE | 6921395 U | 12/1969 |
| DE | 3246910 A1 | 6/1984 |

(Continued)

OTHER PUBLICATIONS

Temple et al., Funktionsflichtige Weischstoff-kompensatoren für Gasturbinenanlagen, vol. 48, No. 3, pp. 34-45, 1996.

(Continued)

*Primary Examiner* — Patrick F Brinson
(74) *Attorney, Agent, or Firm* — Oliff PLC

(57) ABSTRACT

An arrangement for use in adjoining a support structure to a pipe that passes through the support structure. The arrangement comprises a mount attachable to the support structure. Radial bellows are connected to the mount. The bellows are arranged in use to extend circumferentially around a pipe and be connectable thereto such that a volume is defined by the bellows, mount and pipe.

18 Claims, 1 Drawing Sheet

(56) References Cited

U.S. PATENT DOCUMENTS

| | | | |
|---|---|---|---|
| 4,309,007 A | 1/1982 | Logsdon | |
| 5,211,428 A | 5/1993 | Emerson et al. | |
| 5,379,856 A * | 1/1995 | Blee | B62D 3/12 |
| | | | 180/400 |
| 7,677,577 B2 * | 3/2010 | Kanzaki | F16J 3/041 |
| | | | 277/551 |
| 7,950,669 B2 * | 5/2011 | Kozlowski | F16D 3/845 |
| | | | 277/315 |
| 2002/0175480 A1 * | 11/2002 | Tatzreiter | F16J 3/047 |
| | | | 277/634 |
| 2005/0250586 A1 * | 11/2005 | Yamada | B60R 13/0846 |
| | | | 464/170 |
| 2008/0231003 A1 * | 9/2008 | Moriyama | B60R 13/0846 |
| | | | 277/636 |
| 2010/0164186 A1 * | 7/2010 | Dao | F16D 3/226 |
| | | | 277/634 |
| 2017/0219100 A1 * | 8/2017 | Kobayashi | F16J 3/04 |
| 2017/0234434 A1 * | 8/2017 | Shuto | B62D 1/16 |
| | | | 277/504 |

FOREIGN PATENT DOCUMENTS

| | | |
|---|---|---|
| EP | 2535627 A1 | 12/2012 |
| FR | 2690973 A1 | 11/1993 |
| GB | 2423127 A | 8/2006 |

OTHER PUBLICATIONS

Jun. 1, 2017 European Search Report issued in European Patent Application No. 17150845.

Jul. 26, 2016 Search Report issued in Great Britatin Patent Application No. 160182.2.

* cited by examiner

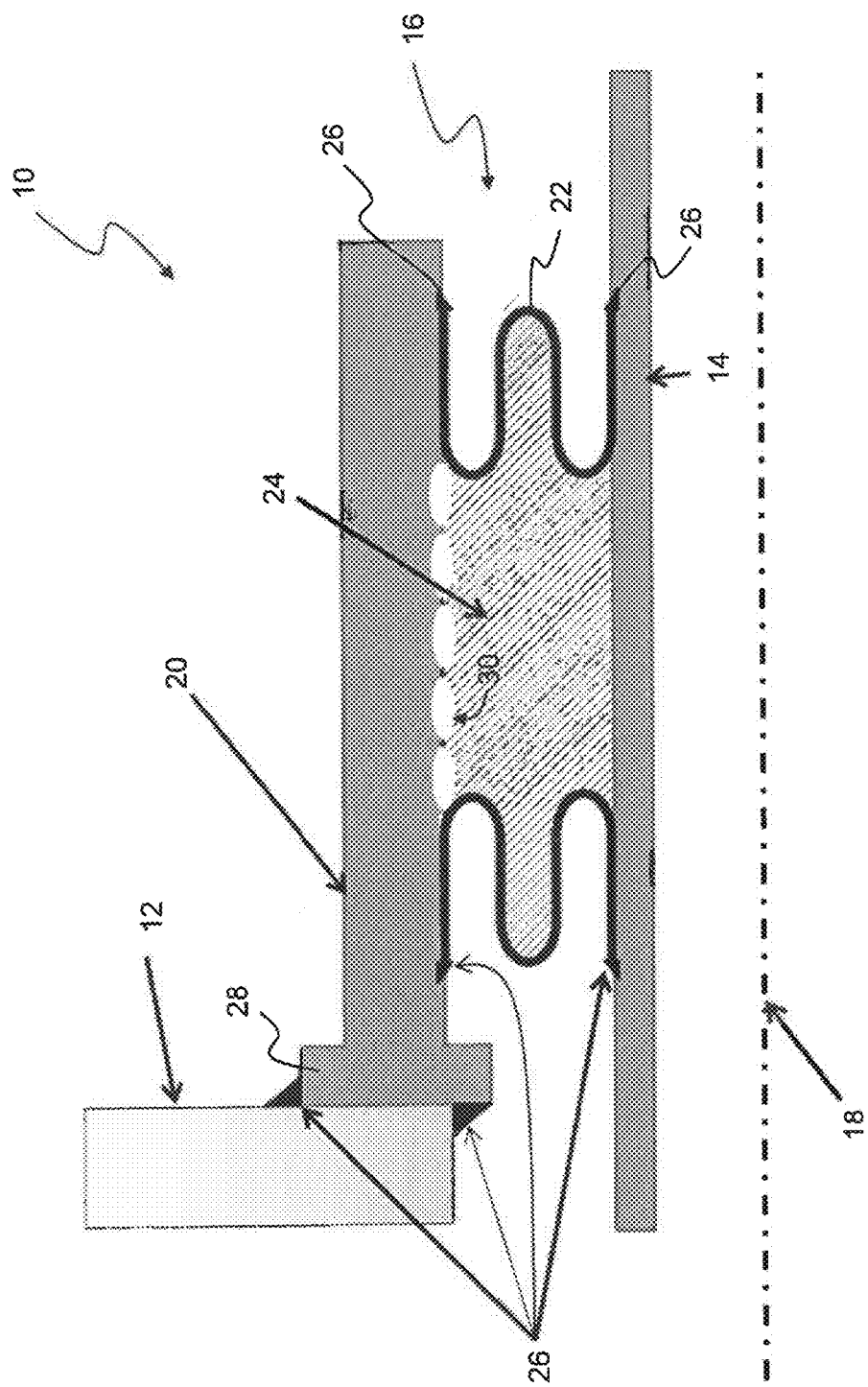

ARRANGEMENT FOR ADJOINING A SUPPORT STRUCTURE TO A PIPE

TECHNICAL FIELD

The present disclosure relates to an arrangement for adjoining a support structure to a pipe and/or an assembly including said arrangement.

BACKGROUND

In many structures and vessels there is a need to reduce the transmission of high frequency noises. One common source of this noise is turbulence in pressurised fluids or gases as they travel through pipes. For example, high frequency noise can be transmitted from the steam pipes into walls and metal structures through which the pipes pass.

In many noise attenuation devices, materials such as rubber are used. However, rubber is often unsuitable for use in harsh environmental conditions. In many applications, a noise attenuation device needs to withstand high temperatures and pressures, and provide an effective seal so as to not compromise structural integrity.

SUMMARY OF DISCLOSURE

In a first aspect there is provided an arrangement for adjoining a support structure (e.g. a metallic support structure) to a pipe, the arrangement comprising a mount attachable to the support structure. Radial bellows are connected to the mount and are arranged to extend circumferentially around a pipe and be connectable thereto such that, in use, a volume (e.g. an annular volume) is defined between the bellows, mount and pipe.

The pipe may extend through the supporting structure.

The bellows may be considered to be two or more concertinaed members. In use, the concertinaed members may extend from the pipe to the mount. The volume may be defined between the two concertinaed members, the mount, and the pipe.

The arrangement may comprise a resilient member provided in the volume defined by the bellows. The resilient member may be arranged to contact the bellows, mount, and pipe. The resilient member may contact an entire inner surface of the bellows (e.g. an entire surface of the bellows that together with the mount and pipe defines the volume between the mount and pipe). The resilient member may be bonded to an entire inner surface of the bellows (e.g. an entire surface of the bellows that together with the mount and pipe defines the volume between the mount and pipe).

The resilient member may be selected so as to provide a desired stiffness of connection between the support structure and the pipe, and/or to damp one or more given frequencies of vibration.

The resilient member may comprise and/or consist of rubber (natural or synthetic), for example silicone rubber.

A surface of the mount that is connected to the bellows and defines a surface of the volume between the mount and the pipe may be profiled to undulate. For example, the surface may be considered to be profiled to include a series of waves.

Alternatively, the surface may be considered to comprise a plurality of recesses and/or protrusions. The surface may undulate in an axial direction. The surface may optionally additionally undulate in a circumferential direction. The pattern of undulations (or recesses and protrusions) may be regular or irregular.

The mount may comprise a tube portion. The tube portion may extend axially in a direction substantially parallel to the pipe. The tube portion may extend circumferentially around the pipe. The mount may comprise a flange connected to the tube portion. The flange of the tube portion may be connectable to the support structure. The mount may be considered to be an annular mount.

The undulating surface may be provided on at least a portion of the radially inner surface of the tube. i.e. the surface of the tube that is proximal in use to the pipe.

The mount may comprise a flange. The flange may be used as a point of connection with a structural member. The flange may extend radially outwardly and radially inwardly from a tube portion of the mount.

The bellows may be made from a metal, e.g. stainless steel.

The bellows may be considered to define an annulus, such that in use the bellows circumscribe the pipe. When the mount defines an annulus. the annulus defined by the bellows may be generally coaxial with the annulus defined by the mount.

The bellows may define one, two, three, four or more lobes. The number of lobes may be selected to provide the desired stiffness of connection between the pipe and the support structure. The number of lobes may further be selected to target damping of vibrations at one or more predetermined frequencies. The wall thickness of the bellows (or of the concertinaed members) may be selected for desired stiffness and damping properties.

When a resilient material is provided in the volume defined by the bellows, mount and pipe, the resilient material may be bonded to the bellows. For example, the resilient member may be connected to the bellows using an adhesive. The area or a portion of the area of the resilient material in contact with the mount and/or the pipe may not be bonded to the mount and/or pipe respectively.

The bellows may be welded to the mount. The welds may be provided on an external surface of the arrangement.

In a second aspect there is provided an assembly comprising a support structure (e.g. a metal structure) and a pipe passing/extending through the support structure. The assembly further comprises an arrangement comprising a mount attachable to the support structure. Radial bellows are connected to the mount and are arranged to extend circumferentially around a pipe and be connectable thereto such that, in use, a volume is defined between the bellows, mount and pipe.

The arrangement may be the arrangement of the first aspect.

The bellows may be welded to the pipe.

The mount may be welded to the support structure.

The welds may be provided external to the arrangement.

In a third aspect there is provided an assembly comprising a support structure (e.g. a metallic support structure) and a pipe (e.g. a metallic pipe) passing through the support structure. A metallic mount is welded to the support structure, Radial metallic bellows are welded to the mount and to the pipe. The bellows extend circumferentially around the pipe and are connected to the pipe such that a volume is defined by the bellows, mount and pipe. A resilient material is provided in the volume defined by the bellows, mount and pipe. The resilient material is bonded to the bellows and contacts each of the bellows, the pipe, and the mount.

The resilient member may comprise silicone rubber.

The mount may include a surface with an undulating profile. The resilient material may contact the surface of the mount with an undulating profile.

DRAWINGS

Examples will now be described with reference to the following drawing in which;

FIG. 1 is a cross sectional view through one half of a metal structure connected to a pipe via an arrangement.

DETAILED DESCRIPTION

Referring to FIG. 1, a metal structure and pipe assembly is indicated generally at 10. The assembly includes a structure 12 connected to a pipe 14 via an arrangement 16. The arrangement 16 is arranged to provide a seal between the pipe and the metal structure so as to seal an air/fluid boundary. The pipe and the structure are metallic. Axis 18 indicates the centre line of the assembly.

The arrangement 16 includes a mount 20 and bellows 22. The bellows 22 are connected to the pipe 14 and the mount is connected to the metal structure 12. A resilient material 24, in this case rubber, is provided in a volume defined by the pipe, bellows and mount.

The bellows 22 are radial bellows provided circumferentially round the pipe 14. The bellows 22 connect to a radially outer surface of the pipe 14. In this example the bellows are connected to the pipe by welding the bellows to the pipe (in FIG. 1 welds are indicated by reference numeral 26). The bellows extend radially outwardly to the mount 20 and are connected to a radially inner surface of the mount, in the present example by welding. In this example the bellows are metallic bellows, e.g. stainless steel bellows.

The mount 20 circumferentially surrounds the pipe 14. The mount 20 can be considered to be a tube. In an at rest position, the mount is assembled to be substantially coaxial to the pipe. A flange 28 is provided at one end of the mount. The flange 28 extends both radially inward and radially outward, but it will be understood that the flange can take any suitable form. The mount is connected to the metal structure 12 by welding the flange to the metal structure.

An annular volume is defined by the pipe 14, bellows 22 and the mount 20. A surface 30 of the mount, i.e. a portion of the radially inner surface of the mount that defines a boundary of the annular volume, is profiled so as to undulate. As mentioned previously, a resilient material 24 is provided in the bellows. The undulating surface 30 of the mount can be defined as a surface of the mount that is adjacent and/or in contact with the resilient material. The undulating surface of the mount can accommodate deformation of the resilient material 24 which can contribute to noise attenuation.

The resilient material 24 should be selected to be able to withstand the temperatures expected in the operational environment. In this example the resilient material is silicone rubber. The resilient material is bonded to the radial bellows. The resilient material is fully enclosed by the pipe, bellows and mount, which means that the resilient material is protected from the operational environment.

The metallic radial bellows 22 can accommodate for thermal and shock movements.

Further, the use of radial bellows increases the surface area of a transmission path in contact with the resilient material 24 which can increase noise attenuation by strained layer damping, that is, a portion of the resilient material spaced from an area bonded to the bellows is relatively constrained. In addition, the portion of the resilient material that is away from the bonded areas reduces sound transmission from the pipe by deforming into the undulating surface of the mount 20.

Provision of the resilient material 24 between the metal structure 12 and the pipe 14 can improve noise performance. The resilient material is protected because it is fully enclosed by the mount 20, bellows 22 and pipe 14.

The bellows 22 are arranged so that the welds are on the outside of arrangement 16, so that the assembly 10 is easier to manufacture.

It is possible to select the wall thickness of the bellows 22, the number of lobes of the bellows and/or the resilient material 24 used to meet the stiffness requirements of a given application, and/or to provide damping at targeted different frequencies without compromising sealing integrity.

The present disclosure has applicability to many different applications, for example in process plants and oil or gas platforms which contain accommodation blocks so noise attenuation is required for habitability and comfort reasons.

It will be understood that the invention is not limited to the examples above-described and various modifications and improvements can be made without departing from the concepts described herein.

The invention claimed is:

1. An assembly comprising:
   a support structure;
   a pipe passing through the support structure,
   a mount connected to the support structure; and
   radial bellows connected to the mount and to the pipe, the bellows extending circumferentially around the pipe and being connected to the pipe such that a volume is defined by the bellows, mount and pipe,
   wherein a resilient material is provided in the volume defined by the bellows, mount and pipe, and contacts each of the bellows, mount and pipe.

2. The assembly according to claim 1, wherein the resilient member comprises silicone rubber.

3. The assembly according to claim 1, wherein the resilient material is bonded to the bellows.

4. The assembly according to claim 1, wherein at least a portion of a surface of the mount that defines a surface of the volume is profiled to undulate.

5. The assembly according to claim 1, wherein the bellows are made from a metal.

6. The assembly according to claim 1, wherein the bellows are welded to the mount.

7. The assembly according to claim 1, wherein the bellows are welded to the pipe.

8. The assembly according to claim 1, wherein the mount is welded to a metal structure.

9. The assembly according to claim 1, wherein the bellows have a wall thickness, and lobe configuration selected so as to meet the stiffness requirements and damping requirements of the assembly.

10. An arrangement for use in adjoining a support structure to a pipe that passes through the support structure, the arrangement comprising:
    an annular mount configured to be attached to the support structure; and
    radial bellows connected to the mount, the bellows being arranged to define an annulus and be coaxial to the mount so that the bellows can circumscribe a pipe and be connected to the pipe so as to define a volume between the bellows, mount and pipe,
    wherein a resilient material is provided in the volume defined by the bellows and the mount, and contacts each of the bellows and the mount.

11. The arrangement according to claim 10, wherein the resilient member comprises silicone rubber.

12. The arrangement according to claim 10, wherein the resilient material is bonded to the bellows.

13. The arrangement according to claim 10, wherein at least a portion of a surface of the mount that defines a surface of the volume is profiled to undulate.

14. The arrangement according to claim 10, wherein the bellows are made from a metal.

15. The arrangement according to claim 10, wherein the bellows are welded to the mount.

16. An assembly comprising:
   a support structure;
   a pipe passing through the support structure,
   a metallic mount welded to the support structure;
   radial metallic bellows welded to the mount and to the pipe, the bellows extending circumferentially around the pipe and being connected to the pipe such that a volume is defined by the bellows, mount and pipe; and
   a resilient material provided in the volume defined by the bellows, mount and pipe, the resilient material being bonded to the bellows and contacting each of the bellows, the pipe, and the mount.

17. The assembly according to claim 16, wherein the resilient member comprises silicone rubber.

18. The assembly according to claim 16, wherein the mount includes a surface with an undulating profile, and the resilient material contacts the surface of the mount with an undulating profile.

* * * * *